(No Model.)
R. HOLCOMBE.
DETACHABLE COUPLING LINK.
No. 590,575. Patented Sept. 28, 1897.
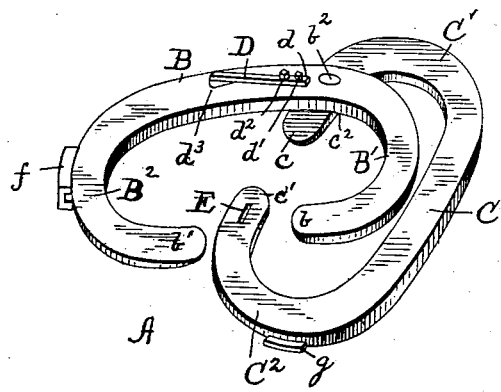
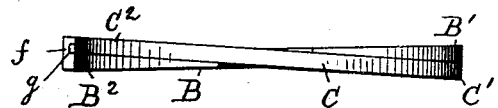
WITNESSES
INVENTOR
Ross Holcombe
By Watson & Co.
Attorneys.

UNITED STATES PATENT OFFICE.

ROSS HOLCOMBE, OF DECATUR, GEORGIA.

DETACHABLE COUPLING-LINK.

SPECIFICATION forming part of Letters Patent No. 590,575, dated September 28, 1897.

Application filed April 15, 1897. Serial No. 632,246. (No model.)

*To all whom it may concern:*

Be it known that I, ROSS HOLCOMBE, a citizen of the United States, residing at Decatur, in the county of DeKalb and State of Georgia, have invented certain new and useful Improvements in Detachable Coupling-Links; and I do hereby declare the following to be a full, clear, and exact description of the invention, such as will enable others skilled in the art to which it appertains to make and use the same.

This invention relates to improvements in detachable coupling-links especially adapted for use in connection with agricultural implements, vehicles, &c.

The object of my invention is to produce such a device which is simple in construction, cheaply manufactured, and which is quickly and easily operated and is certain of action.

The invention consists of further details and improvements, which will be more fully pointed out in the specification and claim.

For a full and complete understanding of the invention reference is to be had to the accompanying drawings, wherein corresponding letters indicate like parts in the several views, and in which—

Figure 1 is a perspective view of the coupling-link in an open or uncoupled position. Fig. 2 is a detail illustrating a spring locking device which may be used to retain the links in a closed position. Fig. 3 shows a side edge view of the device, locking device omitted, and means for retaining the ends in contact when closed and to prevent the same from springing apart.

In the drawings, A refers to the link-coupling device, constructed of suitable metal and formed of two C-shaped portions B and C. These portions or links are similarly formed, having their sides flat and smooth and their ends $b$ $b'$ $c$ $c'$ tapering and sprung slightly apart, so that they lie in different planes practically parallel to each other, the links being reversed one upon the other in such a manner that end $B'$ of link B falls upon end $C'$ of link C and end $C^2$ of link C falls upon end $B^2$ by the end C passing through the opening in link B. When locked together, the end portions lie in planes substantially parallel to each other. The end portion $B'$ of link B, placed uppermost upon end portion $C'$ of link C, is apertured about midway between its central body portion and its extremity. Through the aperture $b^2$ thus formed and a corresponding aperture $c^2$ in link C between the end portion $C'$ and end $c$, falling directly under aperture $b^2$ when the links are placed one upon the other, as before indicated, in a closed position, a rivet or suitable securing-pin is inserted to securely retain the portions together, yet permitting the same to move about the pivot to open and close the device, as indicated in Fig. 1. When these half-shaped portions B and C are interlocked in a closed position, the openings each falling upon a solid portion of the other, the appearance of the device is that of a solid link. (See Fig. 3.)

D is a stiff spring-latch one end, $d$, of which is suitably secured to the upper flat middle portion of link B by a screw $d'$, and adjacent to said screw is a tension-screw $d^2$, as shown in Fig. 1. The free end $d^3$ of said spring is slightly elevated, so as to permit the tapering end portion of end $c'$ of link C to engage and elevate the same when the device is being closed. In the end $c'$, centrally located of the same, is a slot or depression E, which comes into line with and engages said tension-spring D when the device is in a closed position to securely lock the links together. It has been found that in locking devices of this class sudden and great strains upon the link often break or dislocate the same, and to overcome this defect I have formed upon the extreme end portion $B^2$ of link B an upwardly and inwardly projecting lip $f$. (See Fig. 3.)

Upon the extremity of end portion C is formed a projecting lug $g$, which is arranged to engage in said lip $f$ when the links are in a closed position. (See Fig. 3.) This prevents the springing apart of the end portions when in contact, and also avoids any wrenching or strain upon the locking device before referred to when used, besides adds strength to the coupling device, as will readily appear.

In unlocking or detaching the link portions it is only necessary to raise the tension-spring slightly and to pull the link portions in opposite directions. The tension-screw $d^2$ also serves, in connection with the lip and lug before described, to securely lock the links together, when it is desired to use the same continuously as a solid link, by simply screwing said spring tightly into position to prevent the same from being removed or sprung out of slot E.

Having thus described my invention, what I claim, and desire to secure by Letters Patent, is—

A coupling-link comprising two interlocking C-shaped portions, the ends of each being correspondingly sprung slightly apart, one being reversed upon and pivotally secured to the other, a securing device to lock the links together, and a lip upon the end of one link portion, and a lug upon the end of the other portion to engage said lip, when the links are in a closed position, substantially as described and set forth.

In testimony whereof I affix my signature in presence of two witnesses.

ROSS HOLCOMBE.

Witnesses:
HOUSTON LEACH,
W. M. RAGSDALE.